US012330419B2

(12) United States Patent
Iwama et al.

(10) Patent No.: US 12,330,419 B2
(45) Date of Patent: Jun. 17, 2025

(54) LIQUID DISCHARGE HEAD AND IMAGE FORMING APPARATUS

(71) Applicants: Masami Iwama, Ibaraki (JP); Shiomi Andoh, Tokyo (JP)

(72) Inventors: Masami Iwama, Ibaraki (JP); Shiomi Andoh, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 131 days.

(21) Appl. No.: 18/195,376

(22) Filed: May 10, 2023

(65) Prior Publication Data

US 2023/0373212 A1 Nov. 23, 2023

(30) Foreign Application Priority Data

May 17, 2022 (JP) ................................ 2022-081107

(51) Int. Cl.
*B41J 2/14* (2006.01)
*B41J 2/045* (2006.01)

(52) U.S. Cl.
CPC ....... *B41J 2/14233* (2013.01); *B41J 2/04541* (2013.01); *B41J 2002/14258* (2013.01); *B41J 2002/14491* (2013.01)

(58) Field of Classification Search
CPC ................ B41J 2/14233; B41J 2/04541; B41J 2002/14258; B41J 2002/14491; B41J 2/14274
See application file for complete search history.

(56) References Cited

U.S. PATENT DOCUMENTS

2005/0017601 A1 1/2005 Hiyoshi
2013/0068850 A1 3/2013 Iwama
2014/0375712 A1 12/2014 Iwama
2016/0082728 A1 3/2016 Kohda et al.
2016/0096369 A1 4/2016 Shimizu et al.
2016/0185113 A1 6/2016 Yoshida et al.
2016/0236469 A1* 8/2016 Iwama ................ B41J 2/04568
2017/0120602 A1 5/2017 Nakai et al.
(Continued)

FOREIGN PATENT DOCUMENTS

JP 10-286951 10/1998
JP 2000-108346 4/2000
JP 2003-250281 9/2003

*Primary Examiner* — Lisa Solomon
(74) *Attorney, Agent, or Firm* — XSENSUS LLP

(57) ABSTRACT

A liquid discharge head includes a piezoelectric element and a flexible circuit board to supply a driving signal and a common-electrode signal to the piezoelectric element. The piezoelectric element includes multiple drive portions arranged in a first direction; multiple non-drive portions; and multiple dummy drive portions at each portion between the multiple drive portions and the multiple non-drive portions in the first direction; a first electrode configured to supply the driving signal to the multiple drive portions; and a second electrode configured to supply the common-electrode signal to the multiple drive portions. The flexible circuit board includes a third electrode configured to supply the common-electrode signal to the multiple drive portions. Each of the multiple non-drive portions and the multiple dummy drive portions include a common-electrode joint connected to the third electrode of the flexible circuit board.

4 Claims, 10 Drawing Sheets

COMPARATIVE EXAMPLE

(56) References Cited

U.S. PATENT DOCUMENTS

| | | | |
|---|---|---|---|
| 2017/0157924 | A1 | 6/2017 | Otome et al. |
| 2017/0253062 | A1 | 9/2017 | Murakami et al. |
| 2017/0297333 | A1 | 10/2017 | Kohda et al. |
| 2018/0194135 | A1 | 7/2018 | Iwama et al. |
| 2018/0257374 | A1 | 9/2018 | Yoshida et al. |
| 2018/0272743 | A1 | 9/2018 | Nakai et al. |
| 2019/0084313 | A1 | 3/2019 | Kohda et al. |
| 2019/0224974 | A1 | 7/2019 | Kihira et al. |
| 2020/0094573 | A1 | 3/2020 | Kohda et al. |
| 2020/0094595 | A1 | 3/2020 | Iwama et al. |
| 2020/0282740 | A1 | 9/2020 | Kohda et al. |
| 2020/0331262 | A1 | 10/2020 | Andou et al. |
| 2021/0107281 | A1 | 4/2021 | Nakai et al. |
| 2021/0114373 | A1 | 4/2021 | Andoh et al. |
| 2021/0178776 | A1 | 6/2021 | Kohda et al. |
| 2021/0197563 | A1 | 7/2021 | Andoh et al. |
| 2022/0250392 | A1 | 8/2022 | Kohda et al. |

* cited by examiner

COMPARATIVE EXAMPLE

COMPARATIVE EXAMPLE

LIQUID DISCHARGE HEAD AND IMAGE FORMING APPARATUS

CROSS-REFERENCE TO RELATED APPLICATIONS

This patent application is based on and claims priority pursuant to 35 U.S.C. § 119(a) to Japanese Patent Application No. 2022-081107, filed on May 17, 2022 in the Japan Patent Office, the entire disclosure of which is incorporated by reference herein.

BACKGROUND

Technical Field

The present disclosure relates to a liquid discharge head and an image forming apparatus.

Related Art

A method for applying a drive signal to a piezoelectric element of an ink jet head as a liquid discharge head has been developed. The method involves applying a drive signal and a common-electrode signal to drive the piezoelectric element. In this case, the common-electrode signal is supplied from the electrode at an end of the piezoelectric element to the actuator of the piezoelectric element. Further, the technique for heating an inkjet head with an internal heater to lower the viscosity of a high-viscosity ink to a viscosity at which the inkjet head can discharge the ink.

SUMMARY

An embodiment of the present disclosure provides a liquid discharge head includes: a piezoelectric element; and a flexible circuit board configured to supply a driving signal and a common-electrode signal to the piezoelectric element. The piezoelectric element includes: multiple drive portions arranged in a first direction, the multiple drive portions having a comb-shaped structure with a groove between adjacent two of the multiple drive portions; multiple non-drive portions at both sides of the multiple drive portions in the first direction; and multiple dummy drive portions at each portion between the multiple drive portions and the multiple non-drive portions in the first direction, the multiple dummy drive portions having a comb-shaped structure with a groove between adjacent two of the dummy drive portions; a first electrode on one end face of the multiple drive portions in a second direction orthogonal to the first direction, the first electrode configured to supply the driving signal to the multiple drive portions; and a second electrode on another end face of the multiple drive portions in the second direction, the second electrode configured to supply the common-electrode signal to the multiple drive portions. The flexible circuit board includes a third electrode configured to supply the common-electrode signal to the multiple drive portions.

Each of the multiple non-drive portions and the multiple dummy drive portions include a common-electrode joint connected to the third electrode of the flexible circuit board.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1A:
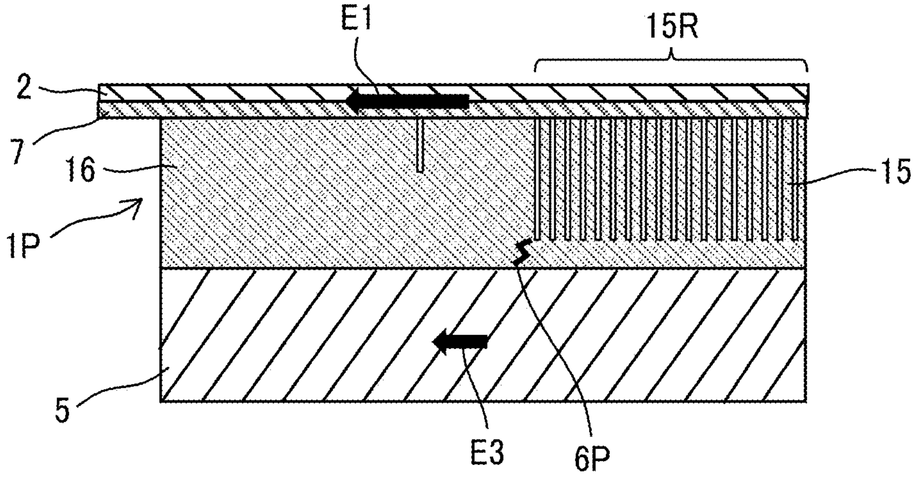
FIG. 1A is an illustration of a configuration of a piezoelectric element and its surroundings according to a comparative example.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Referring now to the drawings, embodiments of the present disclosure are described below. As used herein, the singular forms "a," "an," and "the" are intended to include the plural forms as well, unless the context clearly indicates otherwise.

a comparative example discloses a configuration that applies a voltage to both electrodes with a simple structure in which a conductor such as a flexible printed circuit (FPC) is connected to only one of external electrodes connecting two polarities of internal electrode. Such a structure is obtained by devising a pattern of the internal electrode of a multilayer piezoelectric element serving as a base of an actuator, a pattern of the external electrodes connecting two polarities of the internal electrodes, and a process of separating the internal electrodes into driving units.

Another comparative example discloses the technique for bonding a piezoelectric vibrator and a flexible cable together using an anisotropic conductive film while ensuring sufficient reliability.

However, when the liquid discharge head including conventional comb-shaped grooves of the dummy piezoelectric element is heated by an internal heater, stress is concentrated on the root of the comb-shaped groove at the outermost end of the drive portion element due to the difference in linear expansion coefficients of materials of components of the liquid discharge head and temperature differences between the components. This may cause a crack on a piezoelectric element and a disconnection of the common electrodes of the piezoelectric element, resulting in discharge failure due to no common-electrode signals applied.

Embodiments of the present disclosure enable a configuration that prevents discharge failure due to cracks on the piezoelectric element upon heating the liquid discharge head with an internal heater.

Embodiments of the present disclosure are described below with reference to the attached drawings. Referring now to the drawings, wherein like reference numerals designate identical or corresponding parts throughout the several views thereof, an image forming apparatus according to an embodiment of the present disclosure is described.

A piezoelectric element included in a liquid discharge head according to an embodiment of the present disclosure (hereinafter, appropriately referred to as a "piezoelectric element of the present embodiment") will be described together with a comparative example.

Figure 1B:
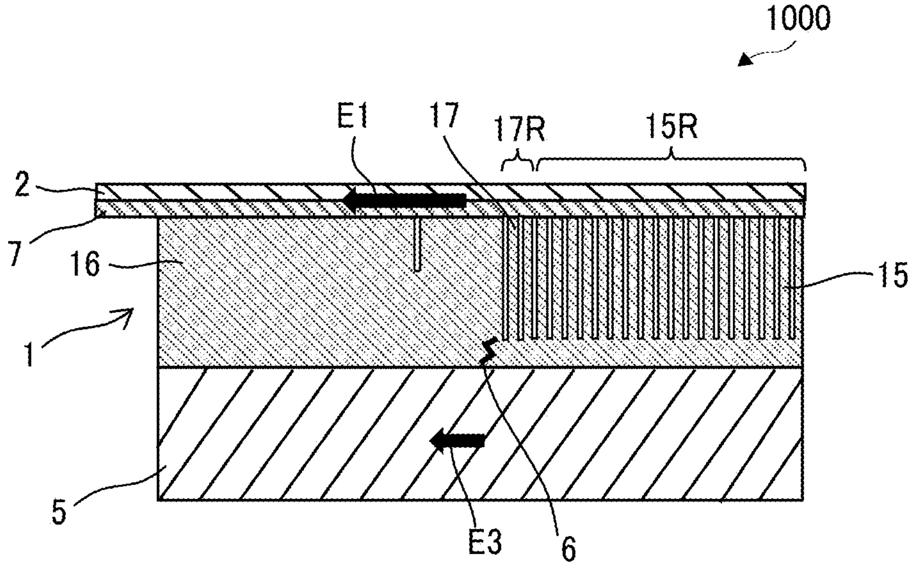
FIG. 1B is an illustration of a configuration of a piezoelectric element included in a liquid discharge head according to an embodiment of the present disclosure.

FIG. 1A is an illustration of a configuration of a piezoelectric element and its surroundings according to a comparative example. FIG. 1B is an illustration of a configuration of a piezoelectric element of the present disclosure. FIGS. 1A and 1B each are cross-sectional views of one end portion of a piezoelectric element 1 or 1P and its surroundings along the arrangement direction (i.e., a direction in which nozzles are arranged) of multiple drive portions 15.

With reference to FIG. 1A, a crack 6P that occurs in a piezoelectric element 1P according to the comparative example is described.

The piezoelectric element 1P is bonded between a base 5 onto which the piezoelectric element 1P is fixed and a liquid-chamber component 7 (e.g., a channel substrate or a diaphragm) and a nozzle plate 2.

The piezoelectric element 1P includes multiple drive portions 15 forming a comb-shaped structure with grooves each between adjacent drive portions 15, and non-drive portions 16. In FIG. 1A, a range 15R refers to a range in which the multiple drive portions 15 are arranged.

The piezoelectric element 1P, the base 5, the liquid-chamber component 7, and the nozzle plate 2 are made of different materials, and when heated with the internal heater of the liquid discharge head, distortion occurs due to the difference in linear thermal expansion coefficient between the materials and the temperature difference between the components. Arrows E1 and E3 indicate an example of the magnitude of the linear thermal expansion coefficient.

With the differences in the linear thermal expansion coefficients of the respective materials, shear stresses are generated in the piezoelectric element 1P between the base 5 and the liquid-chamber component 7 together with the nozzle plate 2, and the stress is concentrated at the outermost grooves of the drive portions 15 when heated. This causes the crack 6P at a position adjacent to the outermost drive portion 15 of the multiple drive portions 15 formed by the comb-shaped grooves in the arrangement direction. Thus, the crack 6P causes disconnection of the common electrodes from the piezoelectric element 1P and hampers application of the common-electrode signal into the piezoelectric element 1P, thus resulting in discharge failure.

In view of such circumstances, a piezoelectric element 1 of the present embodiment as illustrated in FIG. 1B includes a dummy drive portion 17 adjacent to the outermost drive portion 15 of the multiple drive portions 15 (i.e., the outermost drive portions of the multiple drive portions 15 in the arrangement direction or at both sides of the multiple drive portions 15). The dummy drive portion 17 includes a common-electrode joint connected to a common wiring electrode that supplies a common-electrode signal. The other configurations of the piezoelectric element 1P are similar to the piezoelectric element 1P.

A liquid discharge head 1000 of the present embodiment includes a piezoelectric element 1 and a flexible circuit board (or FPC) that supplies a driving signal and a common-electrode signal. The piezoelectric element 1 includes multiple drive portions 15 formed by comb-shaped grooves to adjust the pressure of a pressure chamber; multiple non-drive portions 16 at both sides of the multiple drive portions 15 in the arrangement direction; and an external individual electrode to which a driving signal is supplied. The FPC includes a common wiring electrode that supplies a common-electrode signal. The piezoelectric element 1 further includes multiple dummy drive portions 17 disposed at both sides of the multiple drive portions 15 and formed by comb-shaped grooves. In addition, the multiple non-drive portions 16 and the multiple dummy drive portions 17 each have a common-electrode joint connected to a common wiring electrode.

In FIG. 1B, a range 17R refers to a range in which the dummy drive portions 17 are formed.

As described above, the piezoelectric element 1 of the present embodiment includes the dummy piezoelectric elements formed up to the common-electrode joint 8 of the piezoelectric element 1. The dummy piezoelectric elements have their electrode joint surfaces as common-electrode joints of the dummy piezoelectric elements joined to the common wiring electrode (also referred to as a common-electrode pattern) of the FPC so that the piezoelectric element 1 is joined to the FPC.

Such a configuration prevents discharge failure due to a crack on the piezoelectric element of the liquid discharge head heated by the internal heater and also eliminates control for reducing the heating the heating rate, thus enabling a shorter time from turning on the inkjet head to enabling discharge of a liquid from the inkjet head.

Figure 2:
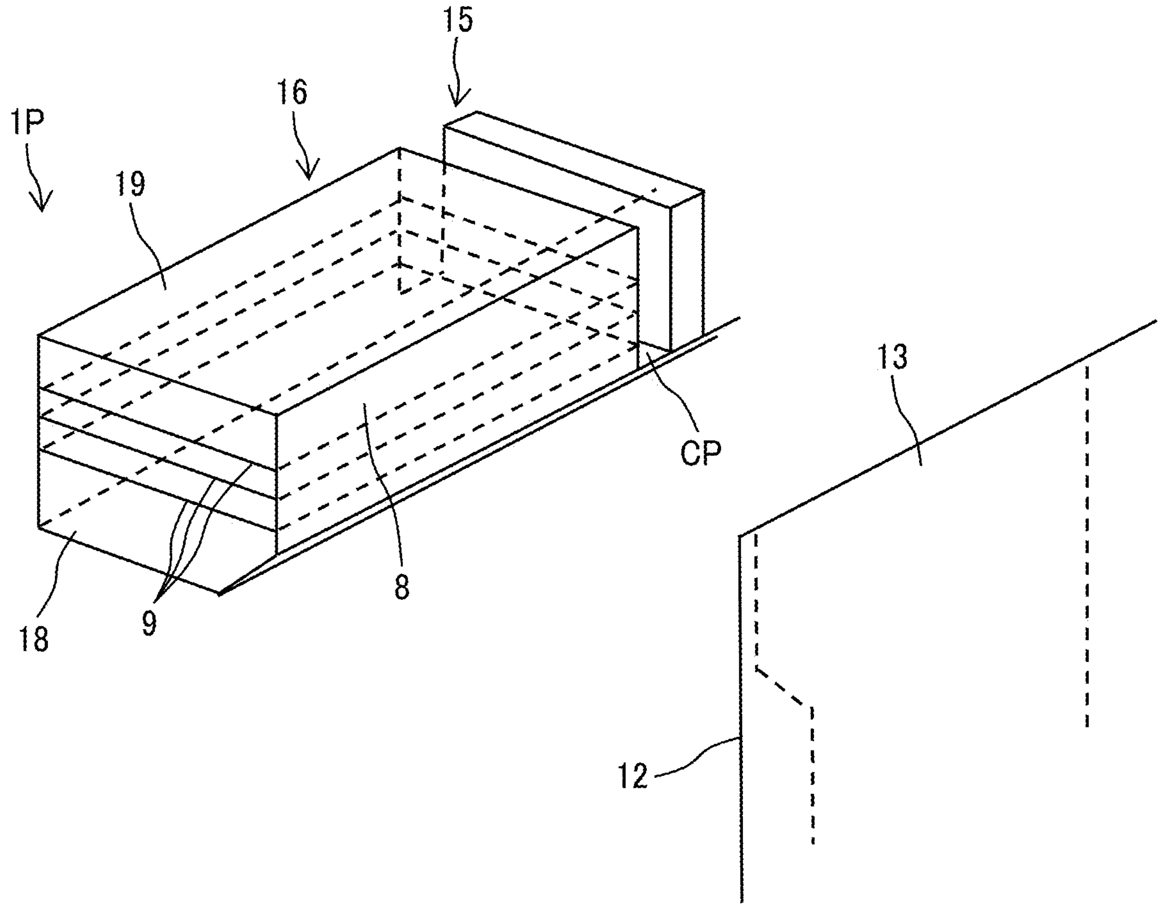
FIG. 2 is an illustration of a configuration of a common electrode at an end portion of a piezoelectric element according to a comparative example.
Figure 3:
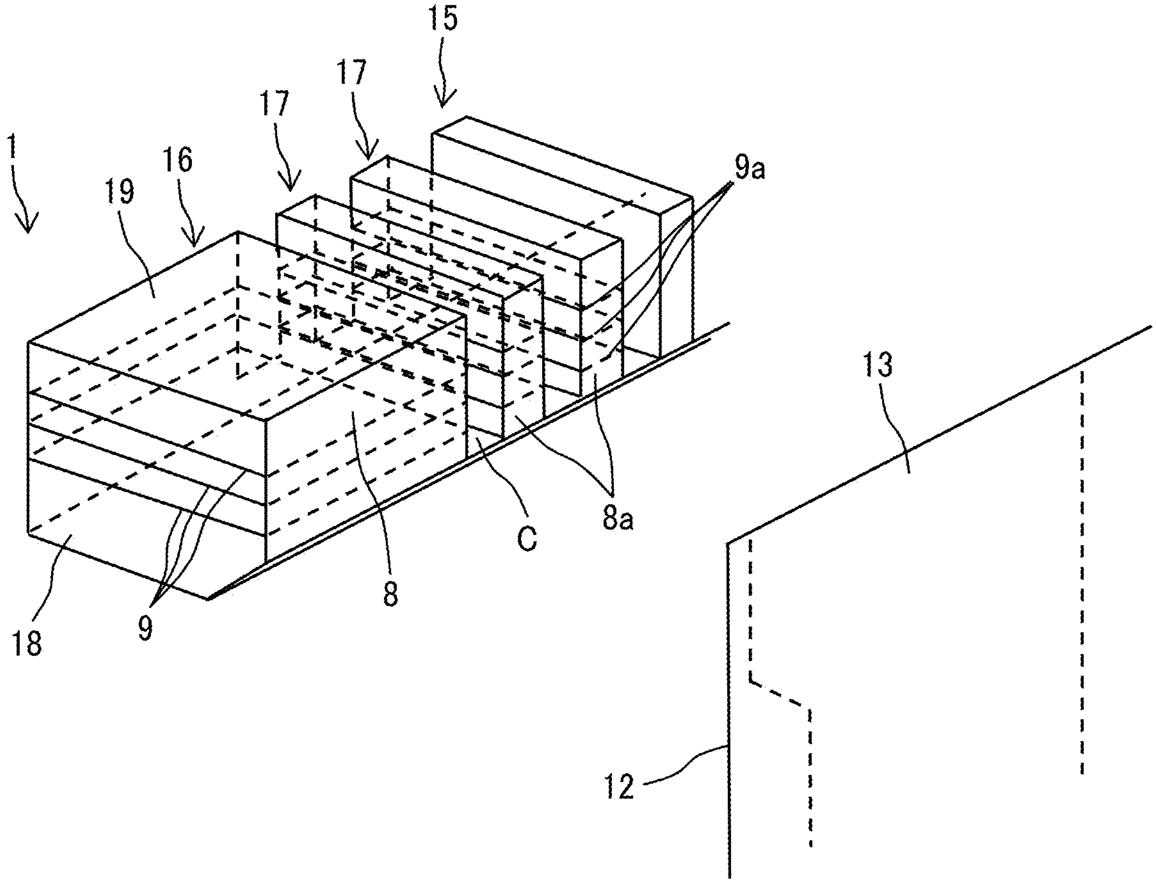
FIG. 3 is an illustration of a configuration of a common electrode at an end portion of the piezoelectric element included in the liquid discharge head according to an embodiment of the present disclosure.

The following describes the fact that the dummy drive portions prevents discharge failure due to a crack on the piezoelectric element, with reference to FIGS. 2 and 3.

FIG. 2 is an illustration of a configuration of a common electrode at an end portion of a piezoelectric element according to a comparative example. FIG. 2 illustrates an FPC 12 joined together with the end portion of the piezoelectric element 1P and one surface of the piezoelectric element 1P.

The multiple drive portions 15 for use in discharge is driven in accordance with a driving signal supplied from the individual electrode and a common-electrode signal supplied from the electrode in FIG. 2.

The common-electrode pattern 13 of the FPC 12 is jointed to the common-electrode joint 8 in the non-drive portion 16 of the piezoelectric element 1P. The common-electrode joint 8 is connected to a first common electrode on the bottom surface 18 of the piezoelectric element 1 through the internal electrode 9 and to a second common electrode on the back surface 19 opposite to the surface (i.e., on the back side of the surface) on which the common-electrode joint 8 is disposed. The first and second common electrodes on the bottom surface 18 and the back surface 19 are connected to the common electrode of the multiple drive portions 15 for driving.

The common-electrode signal is supplied from the common-electrode pattern 13 of the FPC 12 and is supplied to the multiple drive portions 15 through the above-described path.

In FIG. 1A, the occurrence of the crack 6P at a groove portion CP of the piezoelectric element 1P causes a disconnection of the multiple drive portions 15 from the first and second common electrodes on the bottom surface 18 and the back surface 19 of the piezoelectric element 1P. This hampers the multiple drive portions 15 from receiving the common-electrode signals, resulting in discharge failure.

FIG. 3 is an illustration of a configuration of a common electrode at an end portion of a piezoelectric element according to an embodiment of the present disclosure.

In the piezoelectric element 1 of the present embodiment, dummy drive portions 17 are formed at a portion of the common-electrode joint 8 of the non-drive portions 16, and the common-electrode pattern 13 of the FPC 12 is joined to the common-electrode joints 8*a* of the dummy drive portions 17.

Since the stress at the time of heating is concentrated on the groove portion C next to the outermost dummy drive portion 17 closest to the non-drive portion 16 (i.e., the groove portion C between the non-drive portion 16 and the outermost dummy drive portion 17), a crack occurs at the groove portion C.

This configuration allows the common-electrode signals to be supplied from the common-electrode pattern 13 of the FPC 12 to the first and second common electrodes at the bottom surface 18 and the back surface 19 through the common-electrode joint 8*a* and the internal electrodes 9*a* of the dummy drive portions 17, irrespective of the disconnection between the common-electrode joint 8 and the common electrodes of the multiple drive portions 15, which is caused by the crack 6 at the groove portion C of the outermost dummy drive portion 17.

This further allows the common-electrode signals to be supplied from the first and second common electrodes at the bottom surface 18 and the back surface 19 to the common electrodes connected to the internal electrodes of the multiple drive portions 15. Thus, the piezoelectric element 1 is driven to discharge liquids. In other words, such a configuration prevents discharge failure of the piezoelectric element 1.

In the preset embodiment, the crack, which occurs at the position outside the dummy drive portions 17 (i.e., the position between the non-drive portion 16 and the dummy drive portion 17 closest to the non-drive portion 16), has no influence on the characteristics of the liquid discharge head and allows discharge of liquids. This eliminates the restriction on the heating rate of the heater and shortens the time from power-on to the start of discharge.

In FIGS. 1 to 3, two dummy drive portions 17 are formed adjacent to the outermost drive portion 15 of the multiple drive portions 15. In some other examples, at least one dummy drive portion 17 is formed adjacent to the outermost drive portion 15 of the multiple drive portions 15.

The following describes a configuration of an inkjet head that discharge ink droplets as an example of a liquid discharge head incorporating the above-described configuration.

Figure 4:
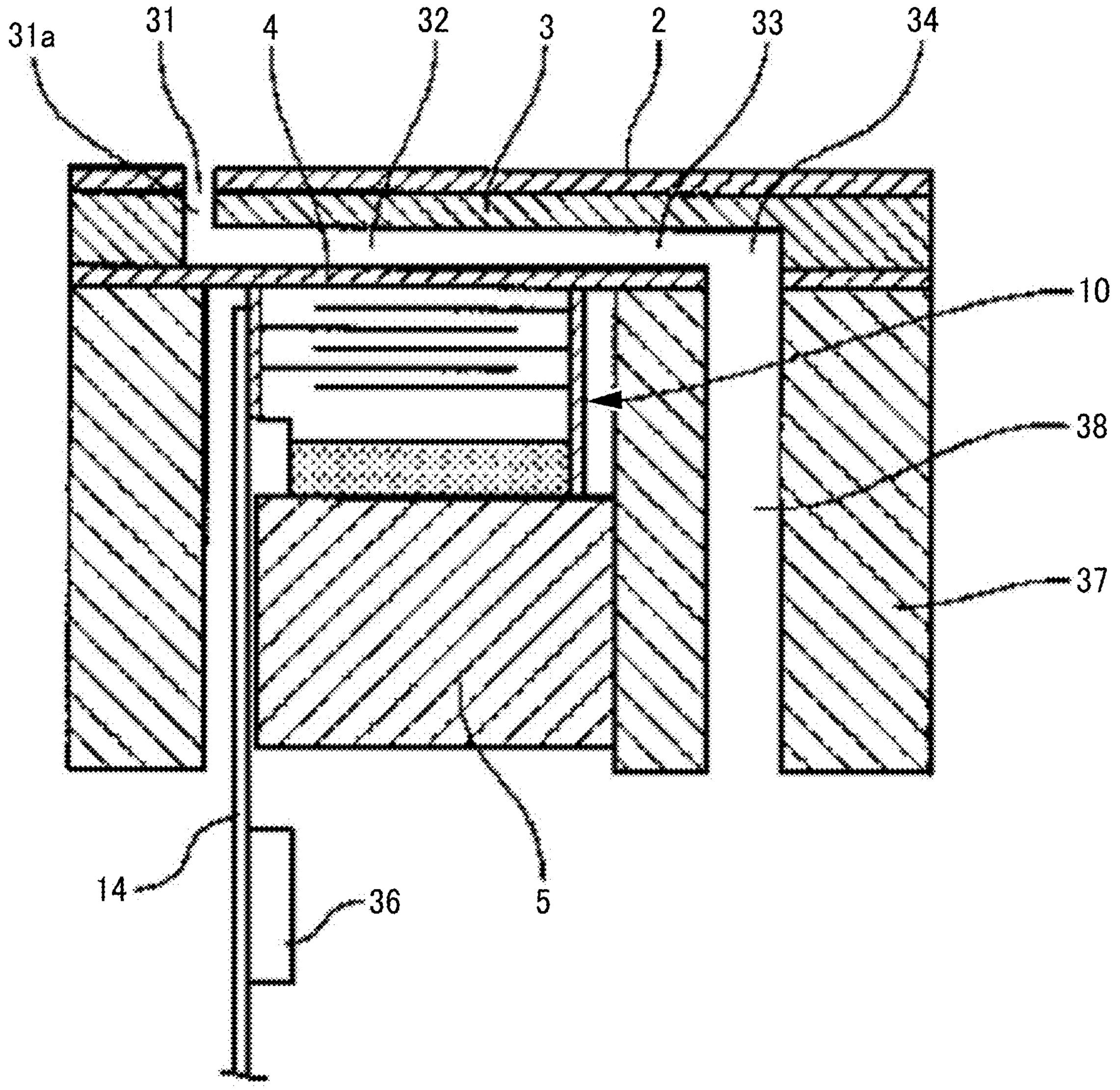
FIG. 4 is a cross-sectional view of an inkjet head along the vertical direction of a liquid chamber according to an embodiment of the present disclosure.

FIG. 4 is a cross-sectional view of an inkjet head along the vertical direction of a liquid chamber (i.e., a direction orthogonal to the arrangement direction of nozzles) according to an embodiment of the present disclosure.

The inkjet head includes a channel substrate 3 made of a single crystal silicon substrate, a diaphragm 4 bonded to a lower surface of the channel substrate 3, and a nozzle plate 2 bonded to an upper surface of the channel substrate 3. These components define a pressure liquid chamber 32 serving as a channel (an ink liquid chamber) communicating with a nozzle 31 for discharging ink droplets as a liquid through an ink communication path 31*a*, and a common liquid chamber 34 for supplying the ink to the pressure liquid chamber 32 through an ink supply channel 33 serving as a fluid resistance portion.

The openings as the ink communication path 31*a* and grooves as the pressure liquid chambers 32, the ink supply channels 33, and the common liquid chambers 34 are formed in the channel substrate 3 by anisotropic etching a single-crystal silicon substrate having a crystal plane orientation of (110) using an alkaline etching solution such as an aqueous potassium hydroxide solution (KOH).

The diaphragm 4 is formed of, for example, a metal plate of nickel, but may be formed of a resin member or a laminated member of a resin member and a metal member.

The nozzle plate 2 forms the nozzles 31 having a diameter of 10 to 30 μm adjusted for each pressure liquid chamber 32, and is bonded to the channel substrate 3 with an adhesive. Note that the nozzle plate 2 may be made of, for example, metal, such as stainless steel or nickel, a combination of metal and resin, such as a polyimide resin film, silicon, or a composite material combining such materials as described above. In addition, a water-repellent film is formed on a nozzle surface (a surface from which a liquid is discharged in a discharge direction, or a discharge surface) using the technique for metal plating or water-repellent agent coating to obtain water repellency to ink.

Piezoelectric elements 10 (also referred to as laminated piezoelectric elements) serving as a driver are bonded to the outer surface of the diaphragm 4 (the surface opposite to another surface closer to the pressure liquid chambers 32) so as to correspond to the pressure liquid chambers 32. The diaphragm 4 and the piezoelectric element 10 define a piezoelectric actuator that deforms the diaphragm 4 as a movable portion.

The piezoelectric element 10 has a surface, which is opposite to another surface joined to the outer surface of the diaphragm 4, bonded to the base 5 with an adhesive, and has one end face in the arrangement direction connected to an FPC cable 14 for applying a drive waveform to the piezoelectric element 10.

In the present embodiment, multiple drive portions 25 (see FIG. 5) corresponding to the respective pressure liquid chambers 32 are formed by forming slits in one elongated piezoelectric element.

The piezoelectric element 10 has its surface opposite to another surface bonded to the diaphragm 4, bonded to the base 5 with an adhesive so that the piezoelectric element 10 is fixed to the base 5.

The FPC cables 14 is provided with multiple driver integrated circuits (ICs) 36 for applying a drive waveform (or electrical signals) to the piezoelectric elements 10A to drive the respective channels for the pressure liquid chambers 32. The FPC cable 14 with the multiple driver ICs 36 allows the level of an electrical signal to be set for each driver IC 36, and facilitates correction of variations in displacement characteristics between the drive channels of the piezoelectric elements 10.

A frame 37 is bonded with an adhesive to the periphery of the diaphragm 4. An ink supply channel 38 is formed in the frame 37. The ink supply channel 38 servers to allow ink to be externally supplied to the common liquid chamber 34. The ink supply channel 38 is opposite to the driver IC 36 across at least the base 5 in the direction orthogonal to the arrangement direction of nozzles. The ink supply channel 38 communicates with the common liquid chamber 34 via a through hole of the diaphragm 4.

Figure 5:
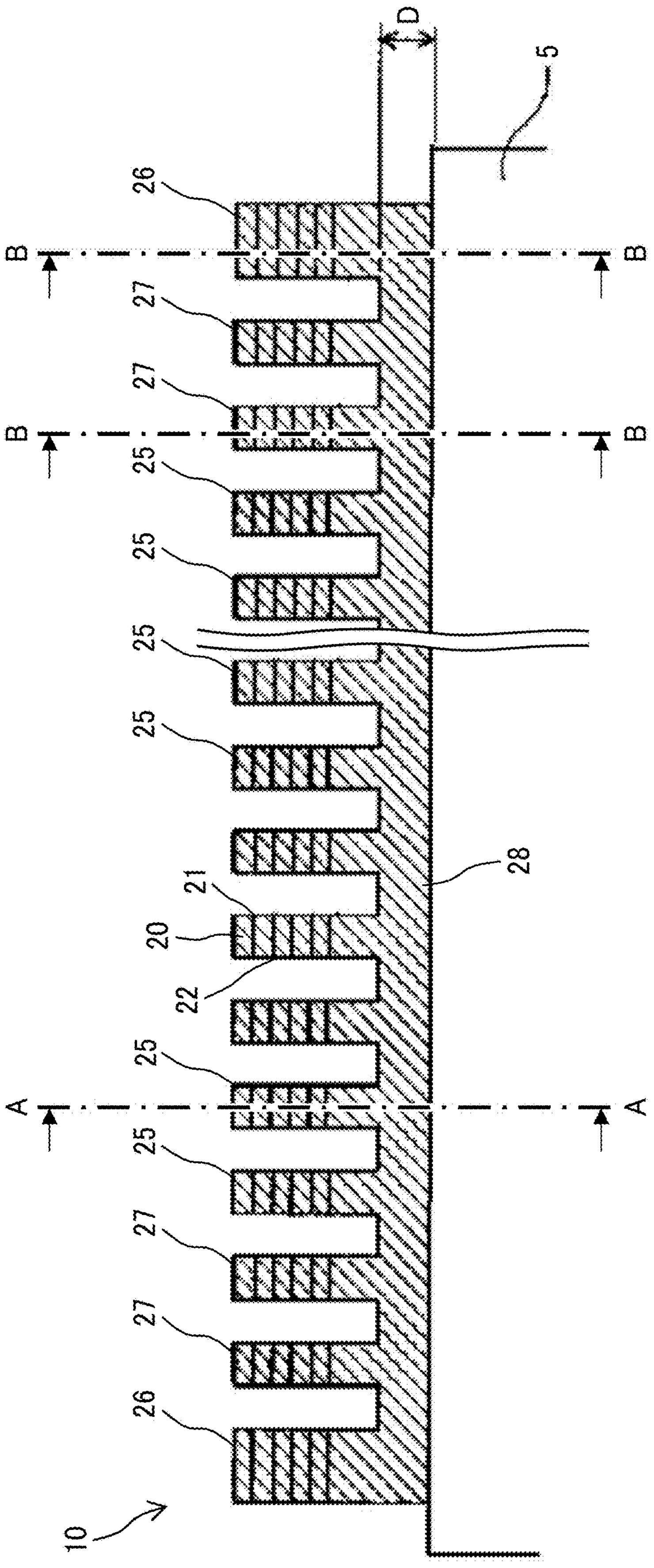
FIG. 5 is an illustration of a portion of a piezoelectric element of the inkjet head in a transverse direction orthogonal to the vertical direction of the liquid chamber according to an embodiment of the present disclosure.

The piezoelectric element 10 is described in detail with reference to FIGS. 5 to 8. FIG. 5 is an illustration of a portion of a piezoelectric element of the inkjet head in a transverse direction (the arrangement direction of the nozzles) orthogonal to the vertical direction of the liquid chamber according to an embodiment of the present disclosure.

Figure 6:
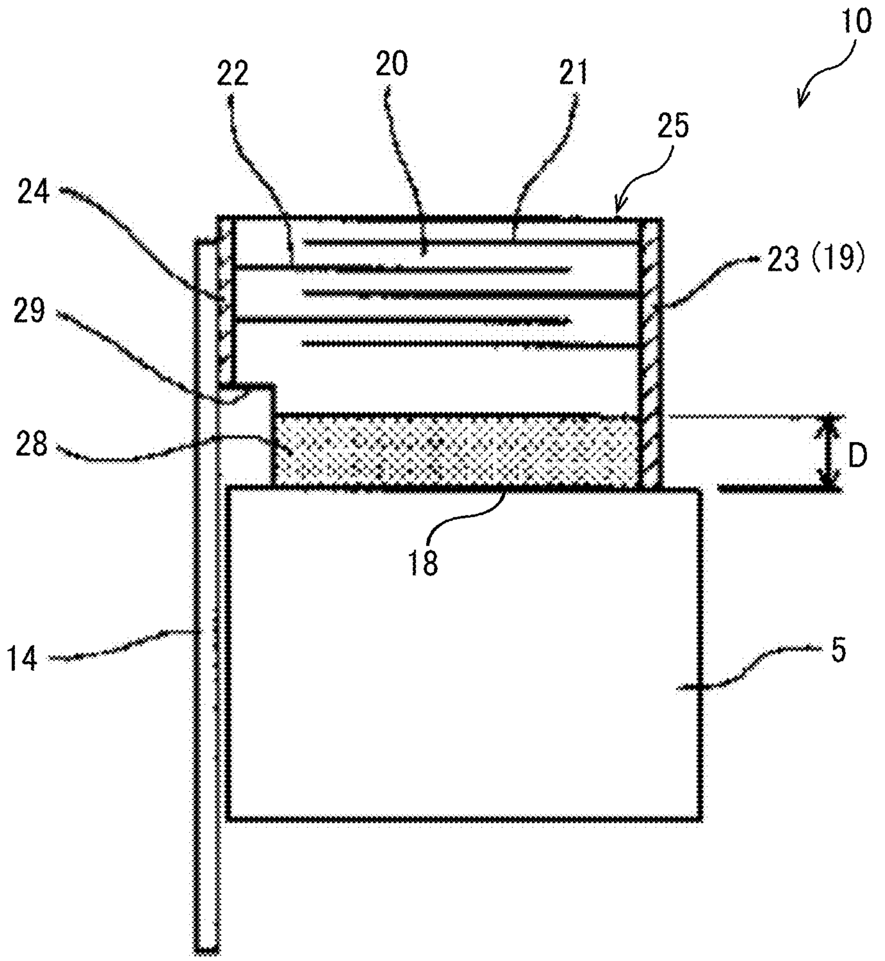
FIG. 6 is a cross-sectional view of the liquid discharge head along a line A-A in FIG. 5.

FIG. 6 is a cross-sectional view of the portion of the piezoelectric element taken along line A-A in FIG. 5.

Figure 7:
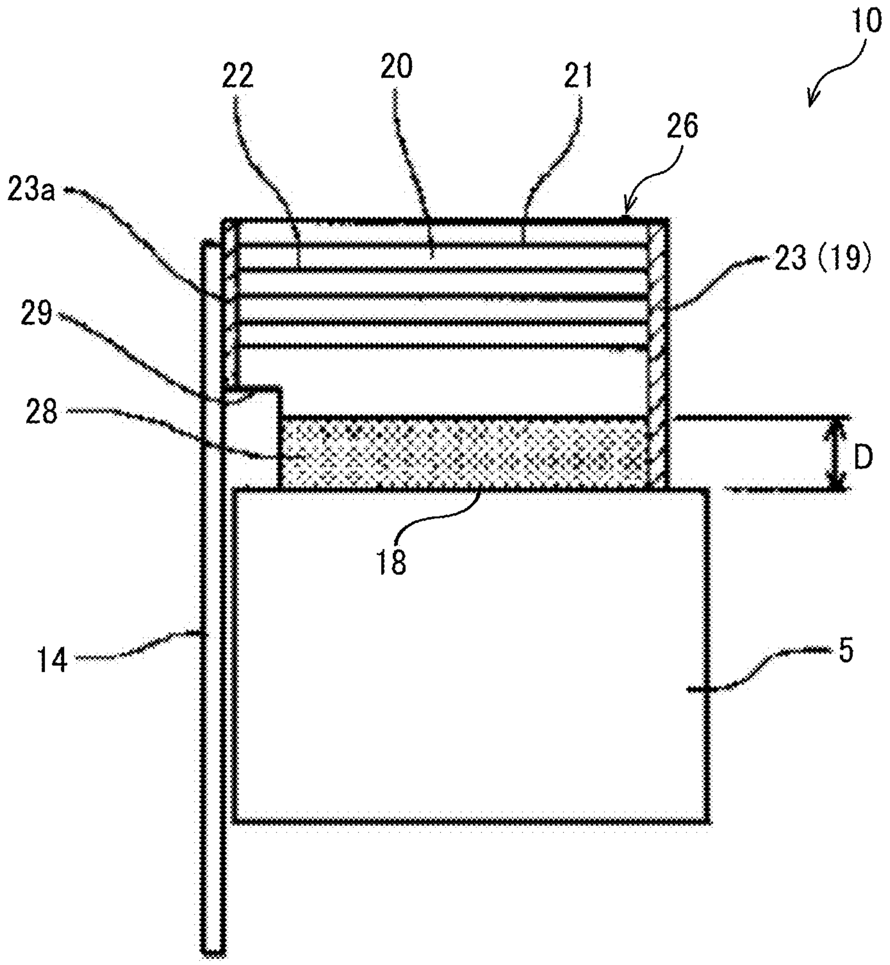
FIG. 7 is a cross-sectional view of the liquid discharge head along a line B-B in FIG. 5.

FIG. 7 is a cross-sectional view of the portion of the piezoelectric element taken along line B-B in FIG. 5.

FIG. 8 is a plan view of an internal electrode pattern.

Figure 8A:
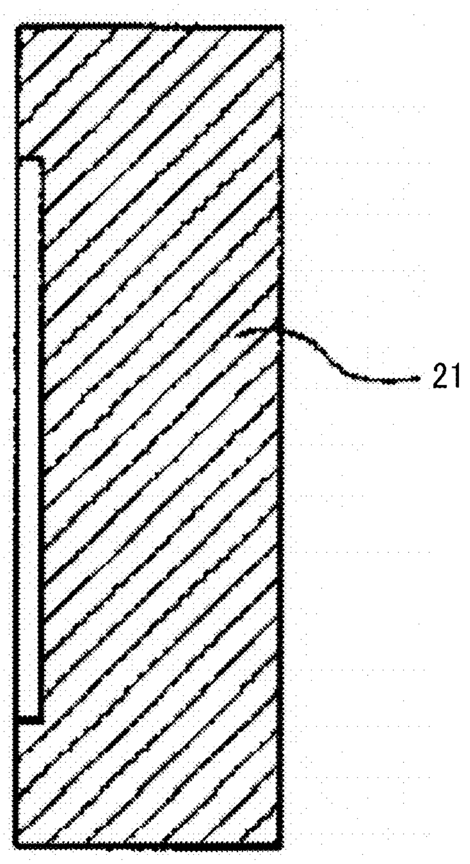
FIGS. 8A and 8B are plan views of an internal electrode pattern.
Figure 8B:
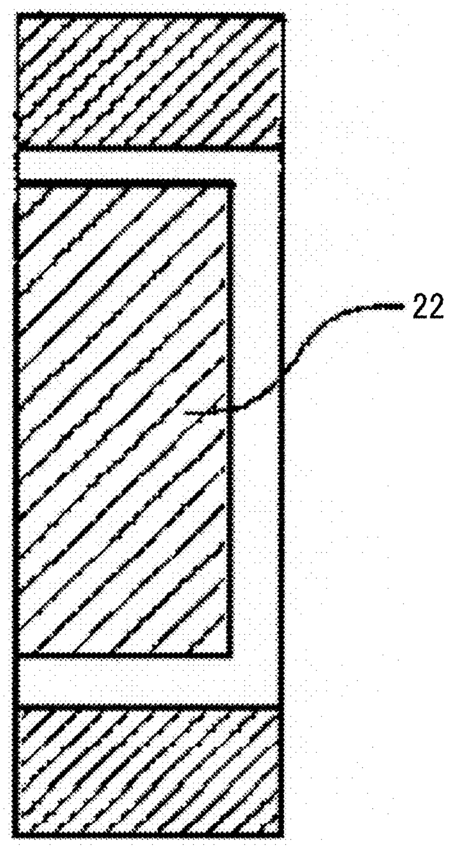

In the piezoelectric element 10, a piezoelectric layer 20 (or a piezoelectric material layer) and a set of a first internal electrode 21 and a second internal electrode 22 are alternately laminated. The first internal electrode 21 and the second internal electrode 22 have pattern shapes as illustrated in FIGS. 8A and 8B. Drive portions 25, non-drive portions 26, and dummy drive portions 27 are formed by performing slit processing or groove processing on the laminate of the piezoelectric layers 20 and the sets of the first internal electrode 21 and the second internal electrode 22 together with external electrodes.

Specifically, the multiple drive portions 25 are formed by comb-shaped grooves, with a common-side external electrode 23 at one end face (i.e., the second common electrode on the back surface 19 in FIG. 3) and an individual-side external electrode 24 at another end face of the piezoelectric element 10 in the direction (a second direction) orthogonal to the arrangement direction (a first direction) of nozzles within the range in which the drive portions 25 are arranged (e.g., the range 15R in FIG. 1B). The multiple dummy drive portions 27 are formed by comb-shaped grooves and arranged adjacent to the outermost drive portions 25 of the multiple drive portions 25 with the common-side external electrodes 23 at one side and the common-electrode joints 23*a* at another side of the piezoelectric element 10 in the second direction (the direction orthogonal to the arrangement direction) within the range in which the non-drive portions 16 and the dummy drive portions 27 are arranged (e.g., the area of the dummy drive portion 16 and the range R17 in FIG. 1B). In other words, the multiple dummy drive portions 27 have a comb-shaped structure with a groove between adjacent two of the multiple dummy drive portions 27. The multiple non-drive portions 26 are adjacent to each of the outermost dummy drive portions of the multiple dummy drive portions 27 in the first direction (i.e., the multiple non-drive portions 26 are on both sides of the piezoelectric element 10).

In the groove processing, a slit is not formed up to the base 5 in the piezoelectric element 10, but a bridge portion 28 having a width D in the depth direction is left at the bottom. Further, a cutout portion 29 is formed on the side of the individual-side external electrode 24 of the piezoelectric element 10 in the arrangement direction of the drive portions 25.

The internal electrode 21 of each drive portion 25 is connected to the common-side external electrode 23, which is not divided by the grooves due to the presence of the bridge portion 28. With such a common-side external electrode 23, the internal electrode 21 of each drive portion 25 is connected to the internal electrodes 21 of the non-drive portions 26 and the dummy drive portions 27 at both sides of the multiple drive portions 25 through the common-side external electrode 23. Further, since the internal electrodes 21 of the non-drive portions 26 and the dummy drive portions 27 are connected to the common-electrode joint 23*a* as illustrated in FIG. 7, the piezoelectric element 10 supplies the common-electrode signals and the individual-electrode signals at one end surface by connecting the FPC cable 14 to the end surface of the individual-side external electrodes 24 and the common-electrode joint 23*a*.

Figure 9:
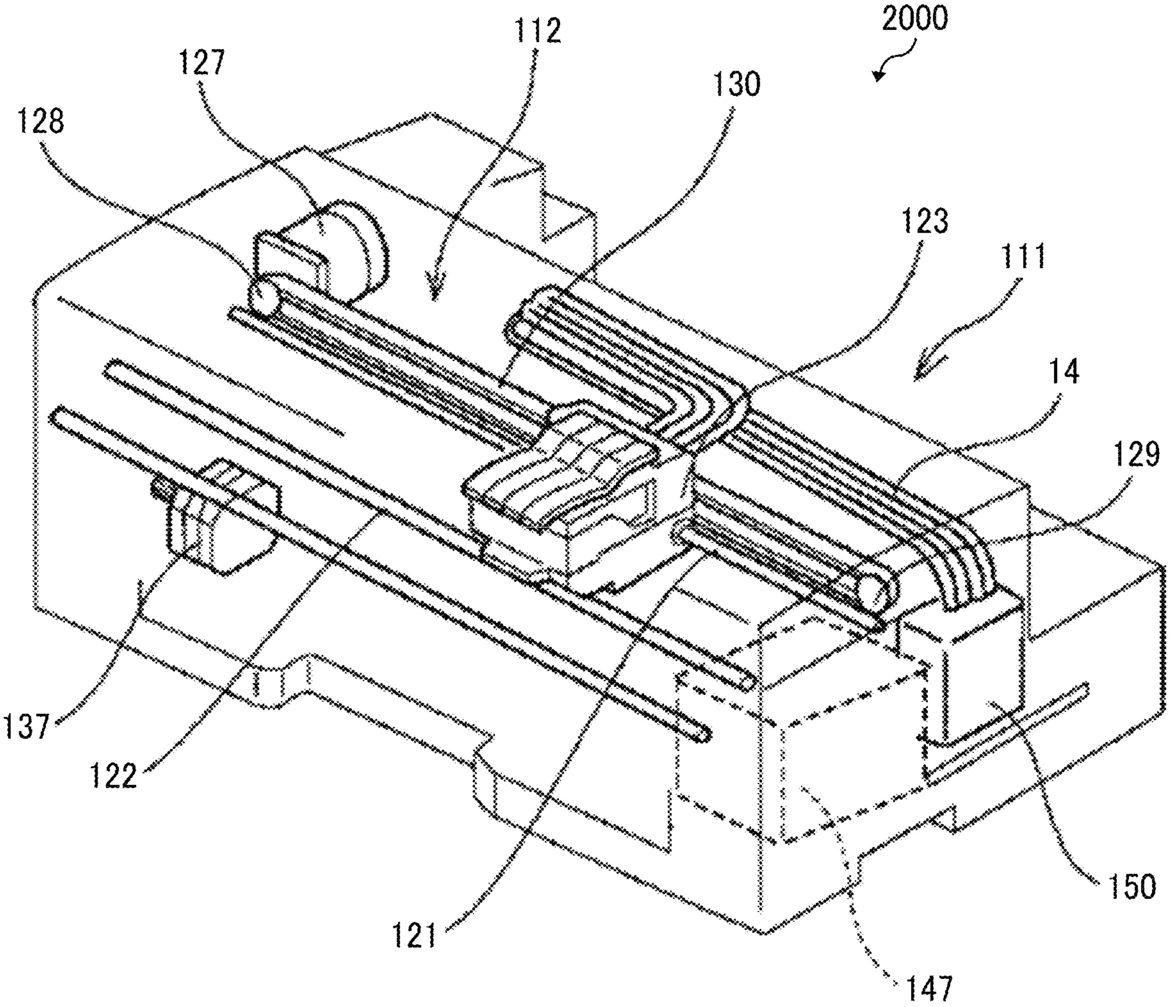
FIG. 9 is a perspective view of an inkjet recording apparatus according to an embodiment of the present disclosure.
Figure 10:
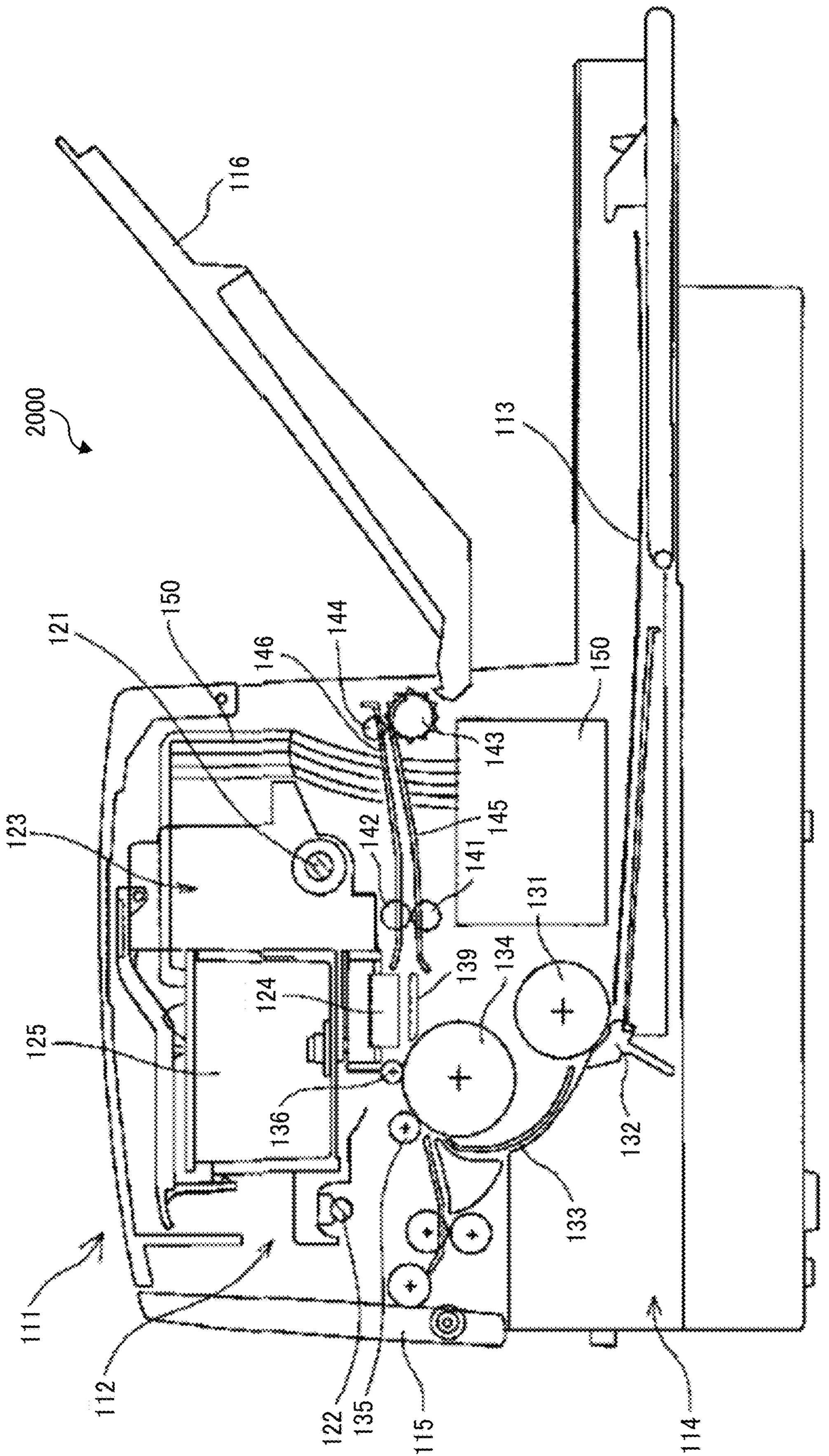
FIG. 10 is a side view of a mechanical section of the inkjet recording apparatus in FIG. 9.

A configuration of an inkjet recording apparatus is described as an example of an image forming apparatus incorporating an inkjet head (or a liquid discharge head) according to an embodiment of the present disclosure. FIG. 9 is a perspective view of the inkjet recording apparatus according to the present embodiment. FIG. 10 is a side view of a mechanical section of the liquid discharge apparatus.

An inkjet recording apparatus 2000 as an example of the liquid discharge apparatus according to the present disclosure includes, for example, a carriage, recording heads, and a printing assembly in a recording apparatus body 111. The carriage is movable in the main scanning direction indicated by arrow MSD in FIG. 9. The recording heads are inkjet heads that are liquid discharge heads according to an embodiment of the present disclosure, and are mounted on the carriage. The printing assembly 112 includes, for example, ink cartridges to supply ink to the recording heads. The inkjet recording apparatus 2000 includes a sheet feeding cassette (or a sheet feeding tray) 114 to stack a large number of sheets 113. The sheet feeding cassette 114 is removably attached to a lower portion of the apparatus body 111 from a front side of the apparatus body 111. The inkjet recording apparatus 2000 further includes a bypass tray 115 and a sheet ejection tray 116. The bypass tray 115 can be inclined to open to manually feed the sheets 113. When the sheet 113 fed from the sheet feeding cassette 114 or the bypass tray 115 reach the printing assembly 112, the inkjet recording apparatus 2000 records a desired image on the sheet 113 with the printing assembly 112 and ejects the sheet 113 onto the sheet ejection tray 116 attached to a rear side of the inkjet recording apparatus 2000.

In the printing assembly 112, a main guide rod 121 and a sub-guide rod 122, which are guide members horizontally mounted on left and right side plates, slidably hold the carriage 123 in a main scanning direction (a direction orthogonal to the sheet conveying direction). The carriage 123 mounts recording heads 124 that includes four inkjet heads for discharging droplets of yellow (Y), cyan (C), magenta (M), and black (BK) inks, respectively. The inkjet heads each include multiple ink discharge nozzle arrays. The recording heads 124 are mounted on the carriage 123 with the multiple ink discharge nozzle arrays intersecting with the main scanning direction MSD and the ink droplet discharging direction coincident with a downward direction. In order to apply a drive waveform to each head 124, an FPC cable 14 for transmitting and receiving a signal between each head 124 and the controller 150 is connected therebetween.

The ink cartridges 125 to supply ink of the respective colors to the recording heads 124 are replaceably mounted on the carriage 123. Each of the ink cartridges 125 has an atmosphere communication port, a supply port, and a porous body. The atmosphere communication port is disposed at an upper portion of each ink cartridges 315 to communicate with the atmosphere. The supply port is disposed at a lower portion of each ink cartridges 315 to supply ink to the recording heads 314. The porous body is disposed inside each ink cartridges 315 to be filled with ink. Ink to be supplied to the recording heads 314 is kept at a slight negative pressure in the ink cartridges 315 by capillary force of the porous body.

Although the recording heads 124 of each color are used in FIGS. 21 and 22 as the recording heads, the recording head 94 may be a single head having nozzles discharging ink droplets of each color.

In the present embodiment, a rear side (a downstream side in a sheet conveyance direction) of the carriage 123 is slidably fitted to the main guide rod 121, and a front side (an upstream side in a sheet conveyance direction) of the carriage 123 is slidably mounted to the sub-guide rod 122. A timing belt 130 is stretched taut between a driving pulley 128, which is driven to rotate by a main scanning motor 127, and a driven pulley 129 to move the carriage 101 for scanning in the main scanning direction. A timing belt 130 is secured to the carriage 123. The carriage 123 is reciprocally moved by forward and reverse rotations of the main scanning motor 127.

The inkjet recording apparatus 2000 further includes a sheet feed roller 131, a friction pad 132, a sheet guide 133, a conveyance roller 134, a conveyance roller 135, and a leading end roller 136 to convey the sheet 113, which is set in the sheet feeding cassette 114, to a portion below the recording heads 124. The sheet feed roller 131 and the friction pad 132 separates and feeds the sheets 113 sheet by sheet from the sheet feeding cassette 114. The sheet guide 133 guides the sheets 113, and the conveyance roller 134 reverses and conveys the sheet 113 fed from the sheet feed roller 131. The conveyance roller 135 is pressed against a circumferential surface of the conveyance roller 134. The leading end roller 136 defines an angle at which the sheet 113 is fed from the conveyance roller 135 and the conveyance roller 134. The conveyance roller 134 is driven to rotate by a sub-scanning motor 137 via a gear train.

A print receiver 139 serving as a sheet guide member for guiding the sheet 113 fed from the conveying roller 134 below the head 124 is provided in correspondence with the moving range of the carriage 123 in the main scanning direction. On a downstream side of the print receiver 139 in the sheet conveyance direction, the inkjet recording apparatus 2000 includes a conveyance roller 141, a spur roller 142, a sheet ejection roller 143, a spur roller 144, and guides 145 and 146. The conveyance roller 141 is driven to rotate with the spur roller 142 to feed the sheet 113 in a sheet ejection direction. The sheet ejection roller 143 and the spur roller 144 further feed the sheet 113 to the sheet ejection tray 116. The guides 145 and 146 form a sheet ejection path.

In recording, the inkjet recording apparatus 2000 drives the recording heads 124 according to image signals while moving the carriage 123, to discharge ink onto the recording sheet 113, which is stopped below the recording heads 124, by one line of a desired image. Then, the recording sheet 113 is fed by a predetermined amount and another line is recorded. When the inkjet recording apparatus 2000 receives a signal indicating that a rear end of the sheet 113 has reached a recording area or an end of recording operation, the inkjet recording apparatus 2000 terminates a recording operation and ejects the sheet 113.

Further, the inkjet recording apparatus 2000 further includes a recovery device 147 to recover the recording heads 124 from a discharge failure. The recovery device 147 is disposed at a position outside a recording area at the right end in the direction of movement of the carriage 123. The recovery device 118 includes a cap unit, a suction unit, and a cleaning unit. During standby for printing, the carriage 123 is moved toward the recovery device 147 and the recording heads 124 are capped with the cap unit. Thus, discharge ports are maintained in humid state, thus preventing discharge failure due to dry of ink. For example, during recording, the inkjet recording apparatus 2000 discharges ink not relating to the recording to maintain the viscosity of ink in all of the discharge ports constant, thus maintaining stable discharging performance.

In the above-described embodiments, the liquid discharge head is used as an inkjet head. In some other examples, the liquid discharge head is used as another liquid discharge head other than inkjet heads, such as a liquid discharge head for discharging a liquid resist that is a liquid and a liquid discharge head for discharging a DNA sample that is a liquid.

Notably, the present disclosure is not limited to the above-described embodiments. In the scope of the present disclosure, it is possible to modify, add, and convert each element of the above-described embodiments into contents that person skilled in the art can easily conceive of.

The following describes aspects of the present disclosure.

Aspect 1

A liquid discharge head includes: a piezoelectric element; and a flexible circuit board configured to supply a driving signal and a common-electrode signal to the piezoelectric element. The piezoelectric element includes: multiple drive portions arranged in a first direction, the multiple drive portions having a comb-shaped structure with a groove between adjacent two of the multiple drive portions; multiple non-drive portions at both sides of the multiple drive portions in the first direction; and multiple dummy drive portions at each portion between the multiple drive portions and the multiple non-drive portions in the first direction, the multiple dummy drive portions having a comb-shaped structure with a groove between adjacent two of the dummy drive portions; a first electrode on one end face of the multiple drive portions in a second direction orthogonal to the first direction, the first electrode configured to supply the driving signal to the multiple drive portions; and a second electrode on another end face of the multiple drive portions in the second direction, the second electrode configured to supply the common-electrode signal to the multiple drive portions. The flexible circuit board includes a third electrode configured to supply the common-electrode signal to the multiple drive portions. Each of the multiple non-drive portions and the multiple dummy drive portions include a common-electrode joint connected to the third electrode of the flexible circuit board.

Aspect 2

In the liquid discharge head according to Aspect 1, the second electrode is on one end face of each of the multiple dummy drive portions in the second direction. The common-electrode joint is on another end face of each of the multiple dummy drive portions in the second direction. Each of the multiple dummy drive portions includes an internal electrode connected to the second electrode and the common-electrode joint.

Aspect 3

An image forming apparatus includes the liquid discharge head according to Aspect 1.

Aspect 4

In the liquid discharge head according to Aspect 2, the piezoelectric element further includes a common electrode on a bottom surface of the piezoelectric element in a third direction orthogonal to the first direction and the second direction. The common-electrode joint is connected to the common electrode via the internal electrode. Each of the multiple drive portions includes another internal electrode connected to the second electrode. Said another internal electrode is connected to the common electrode and the second electrode.

Aspect 5

In the liquid discharge head according to Aspect 4, the third electrode of the flexible circuit board supplies the common-electrode signal to the multiple drive portions via the common electrode and the second electrode.

The above is a description of exemplary embodiments of the present invention. The embodiments of the present invention are not limited to those described above, and various modifications are possible within the scope of the technical idea of the present invention. For example, the embodiments of the present application also include contents obtained by appropriately combining the embodiments explicitly described in the specification or the obvious embodiments.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge head comprising:

a piezoelectric element; and a flexible circuit board configured to supply a driving signal and a common-electrode signal to the piezoelectric element, wherein the piezoelectric element includes:

multiple drive portions arranged in a first direction, the multiple drive portions having a comb-shaped structure with a groove between adjacent two of the multiple drive portions;

multiple non-drive portions at both sides of the multiple drive portions in the first direction; and multiple dummy drive portions at each portion between the multiple drive portions and the multiple non-drive portions in the first direction, the multiple dummy drive portions having a comb-shaped structure with a groove between adjacent two of the dummy drive portions;

a first electrode on one end face of the multiple drive portions in a second direction orthogonal to the first direction, the first electrode configured to supply the driving signal to the multiple drive portions; and a second electrode on another end face of the multiple drive portions in the second direction, the second electrode configured to supply the common-electrode signal to the multiple drive portions, the flexible circuit board includes a third electrode configured to supply the common-electrode signal to the multiple drive portions, and each of the multiple non-drive portions and the multiple dummy drive portions include a common-electrode joint connected to the third electrode of the flexible circuit board, wherein:

the second electrode is on one end face of each of the multiple dummy drive portions in the second direction, the common-electrode joint is on another end face of each of the multiple dummy drive portions in the second direction, and each of the multiple dummy drive portions includes an internal electrode connected to the second electrode and the common-electrode joint.

2. An image forming apparatus comprising:

the liquid discharge head according to claim 1.

3. The liquid discharge head according to claim 1, wherein:

the piezoelectric element further includes a common electrode on a bottom surface of the piezoelectric element in a third direction orthogonal to the first direction and the second direction, the common-electrode joint is connected to the common electrode via the internal electrode, each of the multiple drive portions includes another internal electrode connected to the second electrode, and said another internal electrode is connected to the common electrode and the second electrode.

4. The liquid discharge head according to claim 3, wherein;

the third electrode of the flexible circuit board supplies the common-electrode signal to the multiple drive portions via the common electrode and the second electrode.

* * * * *